April 19, 1927.
J. C. SOLBERG
1,625,751
FLUID PRESSURE INTENSIFIER
Filed June 12, 1925
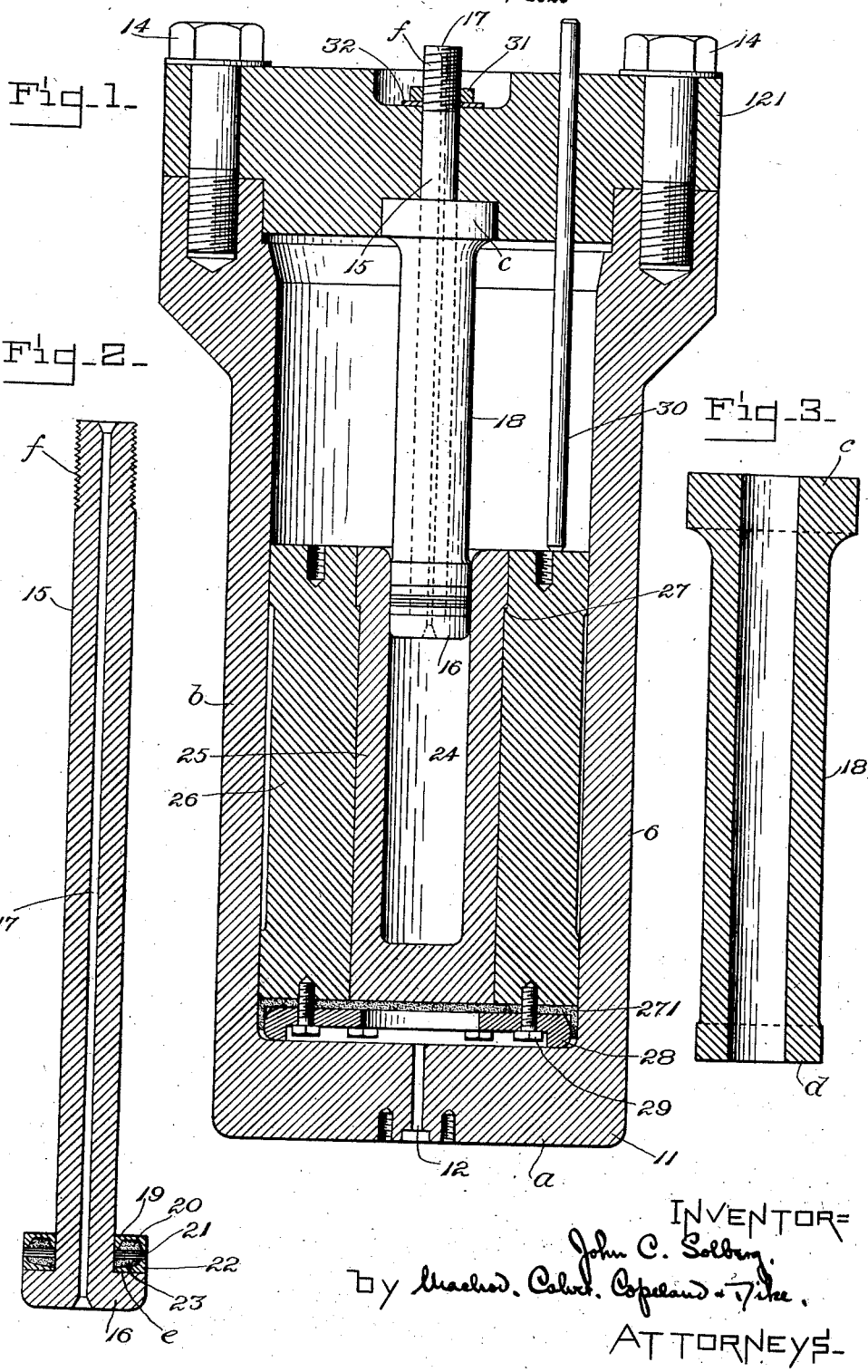

Patented Apr. 19, 1927.

1,625,751

UNITED STATES PATENT OFFICE.

JOHN C. SOLBERG, OF ARLINGTON, MASSACHUSETTS, ASSIGNOR OF ONE-HALF TO FREDERICK C. LANGENBERG, OF CAMBRIDGE, MASSACHUSETTS.

FLUID-PRESSURE INTENSIFIER.

Application filed June 12, 1925. Serial No. 36,755.

My present invention has for its object a device known as an intensifier for delivering fluid such as water or oil under extremely high pressures. Such pressures are now employed in the manufacture of guns, shells and other steel articles to stretch the metal composing the article and thereby to increase its elastic limit.

Heretofore, so far as is known to me, it has been impossible to obtain a suitable intensifier which will supply fluid under pressures greater than 50,000 or 60,000 pounds per square inch. I have found in practice that intensifiers of the kinds heretofore constructed have been entirely incapable of use for pressures of 100,000 pounds per square inch and upwards, or for continued operation at pressures above 50,000 pounds per square inch. The present invention therefore has for its object a simple intensifier capable of delivering fluid under pressures of 100,000 pounds or more and which can be used for considerable periods of time without leakage or failure.

The invention will be fully understood from the following description when taken in connection with the accompanying drawings, and the novel features thereof will be pointed out and clearly defined in the claims at the close of this specification.

In the drawings:

Fig. 1 is a vertical section of an intensifier embodying my present invention.

Fig. 2 is a vertical section of the stem member and packing of the ram, and

Fig. 3 is a vertical section of the sleeve member of the ram.

Referring now to the drawings:

At 11 is shown the main cylinder having a port 12 for connection to the low pressure fluid supply. This fluid is supplied at any convenient pressure, as, for instance, at 10,000 pounds per square inch, being delivered from an ordinary commercial high pressure pump. It will be seen that the head portion $a$ of this cylinder is integral with the wall portions $b$ and, therefore, all difficulty of leakage is avoided, there being no screw threads along which the pressure can follow or which can become deformed by excessive pressures. The other end of the cylinder 11 is closed by a head 12 secured by bolts 14. This head serves solely to support the ram which will be later described and to maintain it in fixed relation relative to the main cylinder 11.

The ram comprises a stem member 15 having an enlarged head 16 with a discharge passage 17 through it, and a sleeve member 18 (see Fig. 3) with an enlarged base $c$ which fits into a suitable hollow in the head 121. Between the end face $d$ of the sleeve member 18 and the end face $e$ of the head 16 of the stem 15 is placed a packing shown in Fig. 2. This packing comprises a ring member 19 preferably of bronze, grooved and filled with lead 20 or some other soft metal, leather washers 21, and a second bronze ring 22 having an annular cutaway space filled with lead or other soft metal 23. It will be seen that the two bronze rings 19 and 22 are not identical in structure, but are preferably made as shown in the drawings so that the soft metal on one of them may contact with the stem 15. The stem is screw-threaded, as shown at $f$, and held in place by a nut 31 and washer 32, but is free to move upward relatively to the head 121 and sleeve 18.

The ram operates in the bore 24 of a cylinder which also acts as the piston for the main cylinder 11. In practice, I make this piston of two parts, part 25 which contains the cylinder bore 24 and which is conveniently referred to as the high pressure cylinder, and part 26 which contacts with the walls of the main cylinder 11. In practice, the two parts are preferably formed with complementary shoulders 27, and the outer member 26 is shrunk on to the inner member 25, thereby strengthening it and enabling it to resist the extreme pressures to which it is subjected with a minimum expansion. An ordinary cup packing 271, held in place by a washer 28 and cap screws 29 serves to maintain a tight relation between the main cylinder 11 and its piston. At 30 is shown a rod loosely mounted in a hole in the removable head of the main cylinder. This serves as a tell-tale or indicator to show to the operator the position of the piston.

It will be understood that the passage 12 is connected to the source of low pressure fluid as, for instance, a pump, and that the passage 17 in the stem of the ram is connected to a pipe or other suitable conduit to conduct the high pressure fluid to the apparatus in which it is to be used. Since the area of the low pressure piston is subjected to the low pressure fluid and is larger than the area of the high pressure cylinder 24, the pressure on the fluid in the high pressure cylinder 24 and in the passage 17 will be correspondingly increased or intensified. For instance, if a pressure of from 8,000 to 10,000 pounds per square inch is used on the low pressure fluid and the area of the low pressure cylinder is twelve times that of the high pressure cylinder, the high pressure fluid can be given a pressure of from 96,000 to 120,000 pounds per square inch. The entire load on the low pressure piston is transmitted to the end area of the stem 15 of the ram and since the stem is free to move with relation to the sleeve 18, the entire load is transmitted to the packing. Therefore, the pressure per unit area on the packing is greater than the pressure per unit area in the high pressure cylinder. The packing being made of bronze, lead and leather is somewhat plastic under these pressures and therefore exerts on the walls of the high pressure cylinder a pressure per unit area which practically equals that exerted by the head of the stem on the end face of the packing. Therefore, the pressure exerted on the wall by the packing is greater than the pressure on the liquid which tends to pass the packing, and a tight joint is made at all times between the ram and the cylinder walls. The bronze rings 19 and 22 of the packing are expanded by the pressure and contact with the wall. They not only serve to help maintain a tight joint but support the leather washers at their extreme edges so that there is no tendency for leather to be shredded off by the edges of the opposing faces or to be forced into the space between the heads and the cylinder walls. This construction has an important bearing on the success of the apparatus, as packings as heretofore constructed have caused a great deal of difficulty by their tendency to shred and for portions of the packing to be forced into the space between the head of the ram and the cylinder walls.

I find in practice that an intensifier which is thus constructed can be used for long periods of time without appreciable deterioration and that there is no substantial leakage at the pressures mentioned.

What I claim is:

1. In combination, a main cylinder, a movable piston therein having a high pressure cylinder formed therein, a ram fixed with relation to the main cylinder and working in the high pressure cylinder, said ram comprising two parts movable with relation to each other, one of said parts being a sleeve secured to the main cylinder, the other of said parts being a headed stem and a packing between the end of the sleeve and the end face of the head of the stem.

2. In combination, a main cylinder, a movable piston therein having a high pressure cylinder formed therein, a ram fixed with relation to the main cylinder and working in the high pressure cylinder, said ram comprising two parts movable with relation to each other and separated by a packing.

3. In combination, a main cylinder, a movable piston therein having a high pressure cylinder formed therein, a ram fixed with relation to the main cylinder and working in the high pressure cylinder, and comprising two parts movable with relation to each other, one of said parts being a sleeve secured to the main cylinder, the other of said parts being a headed stem having an outlet passage therethough, and a packing between the end of the sleeve and the end face of the head of the stem.

In testimony whereof I affix my signature.

JOHN C. SOLBERG.